United States Patent [19]
Uesugi

[11] Patent Number: 5,644,745
[45] Date of Patent: Jul. 1, 1997

[54] APPARATUS FOR REPLACING DATA AVAILABILITY INFORMATION FOR AN INSTRUCTION SUBSEQUENT TO A BRANCH WITH PREVIOUS AVAILABILITY INFORMATION UPON BRANCH PREDICTION FAILURE

[75] Inventor: Takahiko Uesugi, Yamanashi, Japan

[73] Assignee: NEC Corporation, Tokyo, Japan

[21] Appl. No.: 427,700

[22] Filed: Apr. 24, 1995

Related U.S. Application Data

[63] Continuation of Ser. No. 239,933, May 9, 1994, abandoned, which is a continuation of Ser. No. 715,685, Jun. 14, 1991, abandoned.

[30] Foreign Application Priority Data

Jun. 19, 1990 [JP] Japan ...................... 2-160208

[51] Int. Cl.$^6$ ...................................................... G06F 9/38
[52] U.S. Cl. ........................................... 395/392; 395/580
[58] Field of Search ..................................... 395/375, 775, 395/392, 580

[56] References Cited

U.S. PATENT DOCUMENTS

| | | | |
|---|---|---|---|
| 4,514,804 | 4/1985 | Kimoto ..................... | 395/375 |
| 4,760,520 | 7/1988 | Shintani et al. .......... | 395/375 |
| 4,777,592 | 10/1988 | Yano . | |
| 4,827,402 | 5/1989 | Wada ........................ | 395/375 |
| 4,831,515 | 5/1989 | Kamada et al. .......... | 395/375 |
| 4,974,155 | 11/1990 | Dulong et al. ............ | 395/375 |
| 5,043,868 | 8/1991 | Kitamura et al. ......... | 395/775 |
| 5,051,896 | 9/1991 | Lee et al. .................. | 395/375 |

OTHER PUBLICATIONS

Emma, Philip G. et al., "Characterization of Branch and Data Dependencies in Programs for . . . ", *IEEE Transactions on Computers*, vol. C–36, No. 7, Jul. 1987, pp. 859–875.

Sohi, Gurindar S., "Instruction Issue Logic for High–Performance . . . ", *IEEE Transactions on Computers*, vol. 39, No. 3, Mar. 1990, pp. 349–359.

McGeady, S., "The i960CA SuperScalar Implementation of the 80960 Architecture", *Wescon/89 Conference Record*, Nov. 14, 1989, pp. 628–637.

Wang, Lingtao et al., "I–NET Mechanism for Issuing Multiple Instructions", *Proceedings Supercomputing '88*, Nov. 14–18, 1988, Orlando, Florida, pp. 88–95.

Smith, James E., "Dynamic Instruction Scheduling and the Astronautics ZS–1", *Computer*, vol. 22, No. 7, Jul. 1989, pp. 21–34.

*Primary Examiner*—Richard L. Ellis
*Attorney, Agent, or Firm*—Foley & Lardner

[57] ABSTRACT

An information processing apparatus includes a data control circuit, an information holding register, and a selector. The data control circuit has control information corresponding to instructions which can be simultaneously executed, and performs control, even if a result of a preceding instruction is not stored in a general register, so as to execute a subsequent instruction to update the same general register. The information holding register holds data determination information based on an instruction preceding a branch instruction immediately before the branch instruction is executed. The selector replaces data determination information, for an instruction which is not executed when a branch is taken, with data determination information held by the information holding register.

11 Claims, 5 Drawing Sheets

② B S5 ≦ 0 then IC=500

APPARATUS FOR REPLACING DATA AVAILABILITY INFORMATION FOR AN INSTRUCTION SUBSEQUENT TO A BRANCH WITH PREVIOUS AVAILABILITY INFORMATION UPON BRANCH PREDICTION FAILURE

This application is a Continuation of application Ser. No. 08/239,933, filed May 9, 1994, now abandoned; which is a Continuation of application Ser. No. 07/715,685, filed Jun. 14, 1991, now abandoned.

BACKGROUND OF THE INVENTION

The present invention relates to a pipelined information processing apparatus and, more particularly, to a pipelined information apparatus for simultaneously executing a plurality of instructions.

In a conventional pipelined instruction control circuit, different functions are assigned to the respective stages so that instructions to be processed successively flow in the instruction control circuit without data determination. Various resources for a computer are then checked (e.g., checking of register interference conditions and contention of write paths to general registers). When all the execution conditions are satisfied, an execution command is output.

In order to successively execute instructions, the above-described instruction control circuit has control information corresponding to instructions which can be simultaneously executed. A condition as to whether or not an instruction can be executed when it passes through a certain stage is set as a flag of the control information. The instruction flows through the stage in the instruction control circuit in accordance with the state of the flag.

Furthermore, assume that in the instruction control circuit, the result of a preceding instruction is not stored in a general register, and a successive instruction for updating the general register flows to a stage in the instruction control circuit. In this case, even if the result of the preceding instruction is not stored in the general register, the successive instruction can be executed without being stopped at the stage in the instruction control circuit by inhibiting the preceding instruction from being written in the general register.

In the above instruction control circuit, however, if an instruction string is designed such that an instruction (the branch failure side) subsequent to a branch instruction uses the content of the same general register as that for storing the result of an instruction preceding the branch instruction, and a branch success is made by the branch instruction, the instruction subsequent to the branch success uses the result of the instruction preceding the branch instruction which is stored in the general register.

For this reason, if the result of the preceding instruction is not obtained yet, execution of an instruction which uses the result of the subsequent instruction must be suspended until the result of the preceding instruction is determined. That is, execution of the branch instruction is suspended until all the data determination preceding the branch instruction is completed at the branch instruction.

A conventional apparatus will be described below with reference to the accompanying drawings.

Figure 2:
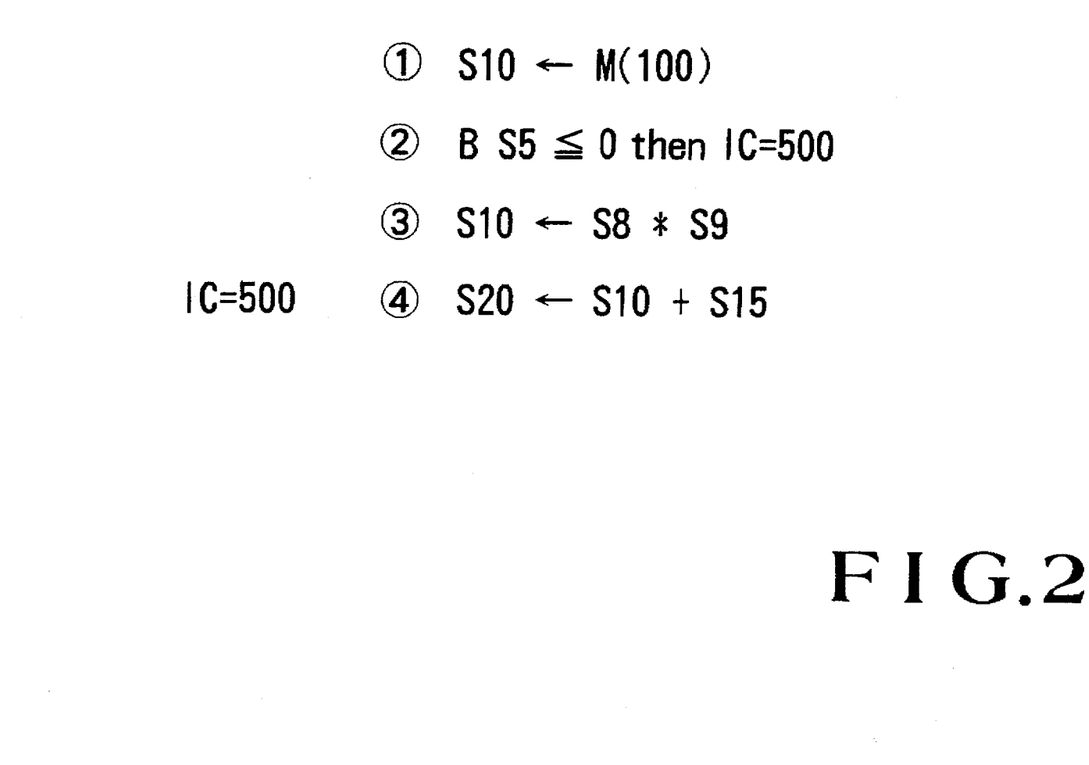
FIG. 2 is a view showing an instruction string designed such that when a branch token is made, an instruction at a branch destination waits for data determination of an instruction preceding a branch instruction.
Figure 4:
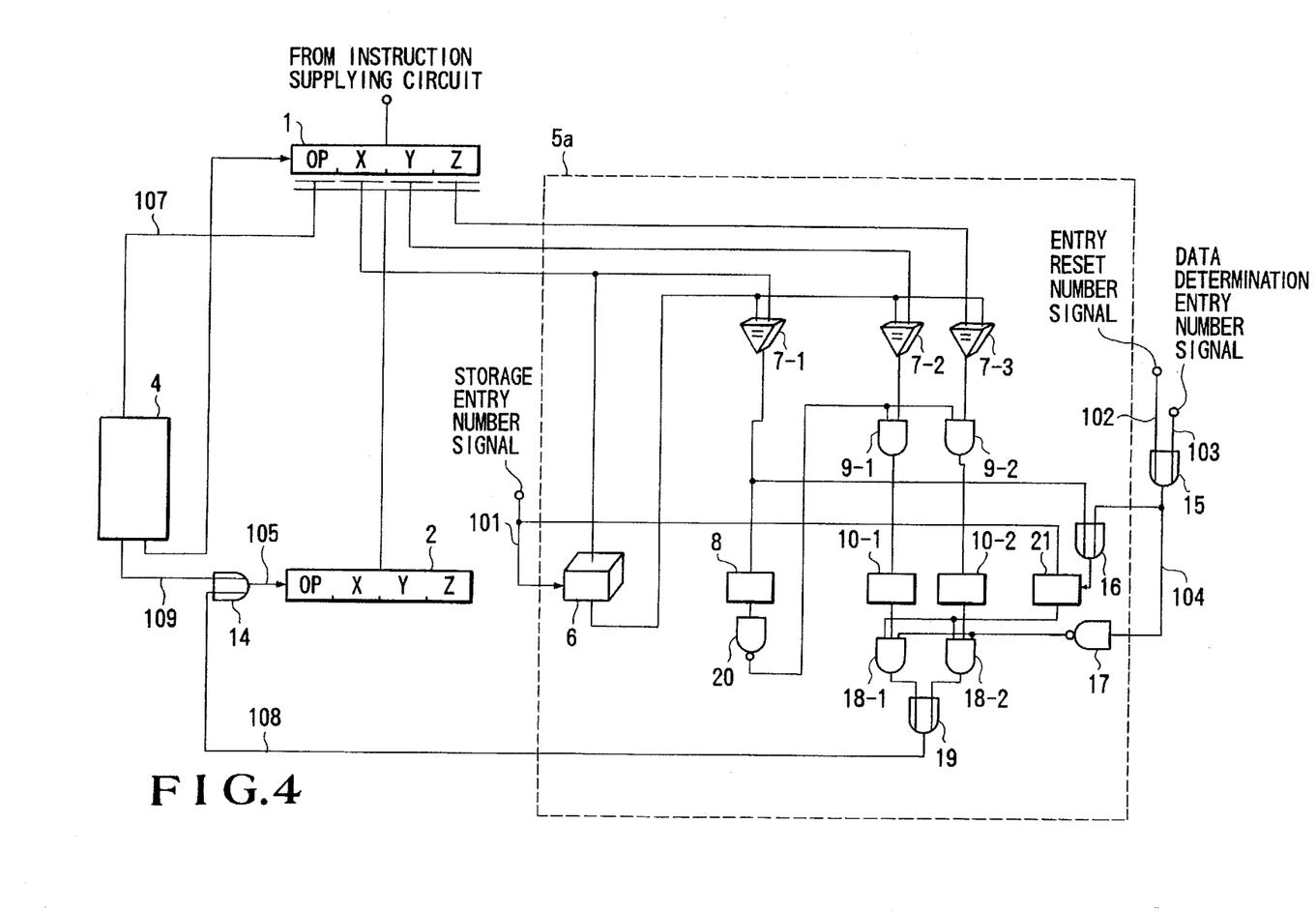
FIG. 4 is a block diagram showing a conventional instruction control circuit.
Figure 5:
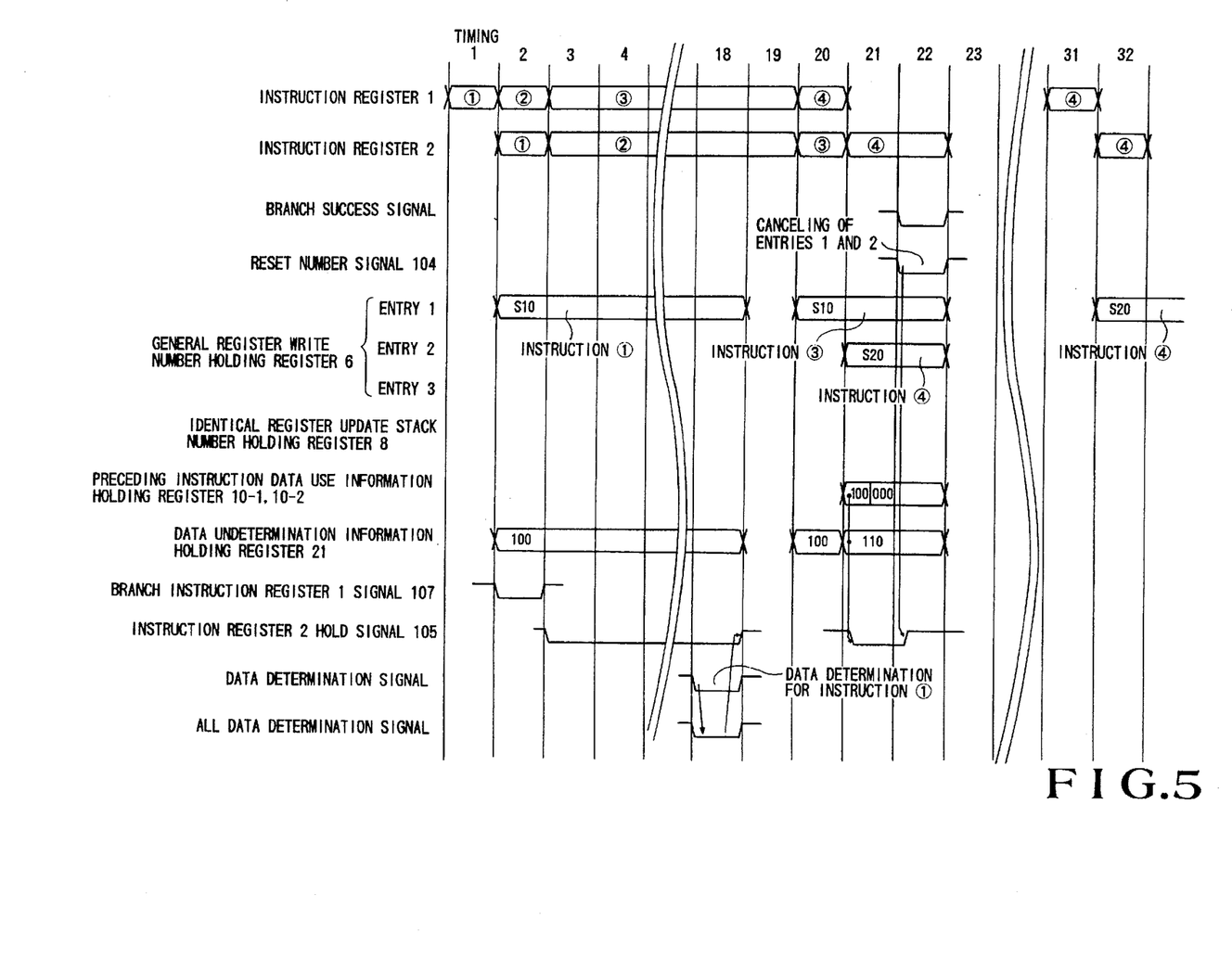
FIG. 5 is a timing chart showing a case wherein the instruction string in FIG. 2 is executed by the conventional instruction control circuit shown in FIG. 4.

FIG. 2 shows an instruction string designed such that when a branch success is made, an instruction at a branch destination waits for determination of data provided before the branch instruction. FIG. 4 shows a conventional instruction control circuit. FIG. 5 shows a case wherein the instruction string shown in FIG. 2 is executed by the conventional instruction control circuit shown in FIG. 4.

Referring to FIG. 4, an instruction register 1 receives instructions and operands from an instruction supplying circuit, and supplies them to an instruction register 2. The instruction registers 1 and 2 are controlled by control signals from an instruction stage control circuit 4 and a conventional data determination control circuit 5a (corresponding to a portion enclosed with a dotted line in FIG. 4).

A general register write number holding register 6 is used when a write instruction with respect to a general register is to be executed. The register 6 has n entries (three entries in this case) and serves to store the number of a general register for which a write operation is performed. The register 6 stores such a number in response to a storage entry number signal 101 which is output when the value of the operand x in the instruction register 1 is transferred to the instruction register 2.

A compare circuit 7-1 detects a coincidence between the operands x respectively stored in the general register write number holding register 6 and the instruction register 1, and stores the value of the operand x in an identical register update stack number holding register (having a 3-bit arrangement in this conventional apparatus) 8. Compare circuits 7-2 and 7-3 detect coincidences between operands y and between operands z respectively stored in the general register write number holding register 6 and the instruction register 1. AND circuits 9-1 and 9-2 then logically AND the values of the operands y and z with a value obtained by inverting the value in the identical register update register number holding register 8 using an inverter 20. The resultant values are respectively stored in preceding instruction data use information holding registers 10-1 and 10-2 (each having a 3-bit arrangement in this conventional apparatus, the 3 bits of the register 10-1 indicating entries 1, 2, and 3 on the y operand side, and the 3 bits of the register 10-2 indicating entries 1, 2, and 3 on the z operand side).

A data undetermination information holding register 21 stores the information of the storage entry number signal 101, and is operated to reset an entry bit in which "1" is set when an OR circuit 16 logically ORs the value obtained by the compare circuit 7-1 with a reset number signal 104 as the OR product of an entry reset number signal 102 for canceling an instruction on an instruction stage upon a branch success, and a reset signal (data determination entry number signal 103) corresponding to a data determination entry.

Subsequently, an OR circuit 19 logically ORs the values of the preceding instruction data use information holding registers 10-1 and 10-2 with a value obtained by masking the value in the data undetermination information holding register 21 with the reset number signal 104 (which is performed by an inverter 17 and AND circuits 18-1 and 18-2). If the resultant value is "1", an instruction register 2 hold 1 signal 108 which is logically ORed with an instruction register 2 hold 2 signal 109 by an OR circuit 14. As a result, an instruction register 2 hold signal 105 is enabled and held in the instruction register 2.

When a branch instruction is supplied to the instruction register 1, a branch instruction register 1 signal 107 is transmitted to the instruction stage control circuit 4. The circuit 4 then outputs the instruction register 2 hold 2 signal 109 to hold the instruction in the instruction register 2 at the next timing. As a result, the instruction is held in the instruction register 2.

When the instruction passes through the instruction register 2, an instruction execution command is output.

FIG. 2 shows an instruction string designed such that a branch instruction is successfully executed, and current determination information data is lost.

Assume that a 3-operand instruction is used, and the three operands are respectively called operands x, y, and z, and that data are basically read out from general registers designated by the operands y and z to be calculated, and the calculation result is stored in a general register designated by the operand x.

Referring to FIG. 2, an instruction ① indicates that data is loaded from a memory of number 100 into a general register of number 10. Similarly, an instruction ② indicates that if the content of a general register of number 5 is 0 or less, control branches to an instruction of IC=500 (in this case, it is assumed that the instruction of IC=500 corresponds to an instruction ④). An instruction ③ indicates that the contents of general registers of numbers 8 and 9 are multiplied together, and the product is stored in the general register of number 10. An instruction ④ indicates that the content of the general register of number 10 is added to that of a general register of number 15, and the sum is stored in a general register of number 20.

FIG. 5 is a timing chart obtained when the instruction string in FIG. 2 is executed by the conventional apparatus in FIG. 4.

At timing 1, the instruction ① is set in the instruction register 1. At timing 2, since the instruction ① is an instruction to store the resultant data in the general register of number 10, "10" is set in the entry 1 of the general register write number holding register 6, and the instruction ① is transferred to the instruction register 2. Upon setting of the instruction ① in the entry 1, "100" is set the data undetermination information holding register 21, and the instruction ② is newly set in the instruction register 1.

In addition, at timing 2, since the instruction in the instruction register 1 is a branch instruction, a branch instruction register 1 signal is transmitted to the instruction stage control circuit 4. The instruction ② is held in the instruction register 2 in response to the instruction register 2 hold signal 105 output from the instruction stage control circuit 4 at timing 3.

The successive instruction ③ is held in the instruction register 1 in response to a register holding signal output from the instruction stage control circuit 4. From timing 5 to timing 17, no change occurs in the respective registers.

At timing 18, after the instructions ③ and ② are respectively held in the instruction registers 1 and 2, when a signal (data determination signal) for determining that the result of the instruction ① is stored in the general register of number 10 is supplied, all the data determination signals have been output. As a result, the instruction register 2 hold signal 105 is canceled. At the same time, the register holding signals output from the instruction stage control circuit 4 to the instruction registers 1 and 2 are canceled. Hence, at timing 20, the instruction in the instruction register 1 is transferred to the instruction register 2. An execution command is output with respect to the instruction ② in the instruction register 2.

Since the instruction ③ is an instruction to store the resultant data in the general register of number 10, "10" is set in the entry 1. At the same time, "100" is set in the data undetermination information holding register 21.

At timing 21, since the instruction ④ is an instruction to store the resultant data in the general register of number 20, "20" is set in the entry 2 of the general register write number holding register 6.

In addition, since the operand y of the instruction ④ indicates the data which is read from the general register of number 10, the value in the general register write number holding register 6 and the values of the operands y and z in the instruction register 1 are compared with each other by the compare circuits 7-2 and 7-3 to detect a coincidence. Since values "100" and "000" are set for the operand y and z and are respectively supplied to the AND circuits 9-1 and 9-2, "100" and "000" are respectively stored in the preceding data use information holding registers 10-1 and 10-2. At the same time, "1" is set in the entry 2 of the data undetermination information holding register 21, and "110" is stored in the register 21.

At this time, since the AND product of the value ("110") of the data undetermination information holding register 21 and the values ("100" and "000") of the preceding instruction data use information holding registers 10-1 and 10-2 is not "0", the OR product thereof obtained by the OR circuit 19 becomes "1". As a result, at timing 22, the data in the instruction register 2, i.e., the instruction ④, is held in response to the instruction 2 hold signal 105.

At timing 22, since it is determined that the branch instruction ② has succeeded, the reset number signal 104 is output to cancel the instructions ③ and ④ on the branch failure side (i.e., the reset number signal 104 is output to the entries 1 and 2 at which the instructions ③ and ④ are registered). As a result, the instruction ④ is removed from the instruction register 2.

When the branch success is made, the instruction ④ is supplied from the instruction supplying circuit at timing 31. At timing 32, the instruction ④ is executed.

In the above-described conventional pipelined instruction control scheme, until a success or failure of a branch instruction is determined, control information for a successive instruction is stored in an instruction control unit. For this reason, the result of an instruction (on the branch failure side) subsequent to the branch instruction is stored in the same general register as that for storing an instruction preceding the branch instruction. In this case, if an instruction string is designed such that an instruction subsequent to a branch instruction uses the result stored in the general register, and a branch success is made by the branch instruction, the instruction subsequent to the branch success inevitably uses the result stored in the general register which is stored prior to the branch instruction. If, therefore, the result of the instruction has not been obtained yet, execution of the subsequent instruction which uses the result of the preceding instruction must be suspended until the result of the instruction is determined. Since data determination for all the instructions preceding the branch instruction is completed at the branch instruction, execution of the branch instruction is inevitably delayed.

SUMMARY OF THE INVENTION

It is an object of the present invention to provide an information processing apparatus in which execution of a branch instruction need not be suspended until data determination of all the data preceding the branch instruction is completed.

It is another object of the present invention to provide an information processing apparats which can execute an instruction string including a branch instruction at high speed.

In order to achieve the above objects, according to the present invention, there is provided an information processing apparatus with a data control circuit, having control information corresponding to instructions which can be simultaneously executed, for performing control operations, even if a result of a preceding instruction is not stored in a general register. A subsequent instruction to update the same general register. The circuit also includes an information holding register for holding data determination information based on an instruction preceding a branch instruction immediately before the branch instruction is executed, and a replacing circuit for replacing data determination information for an instruction, which is not executed upon a branch token, with data determination information held by the information holding register.

DESCRIPTION OF THE PREFERRED EMBODIMENT

Figure 1:
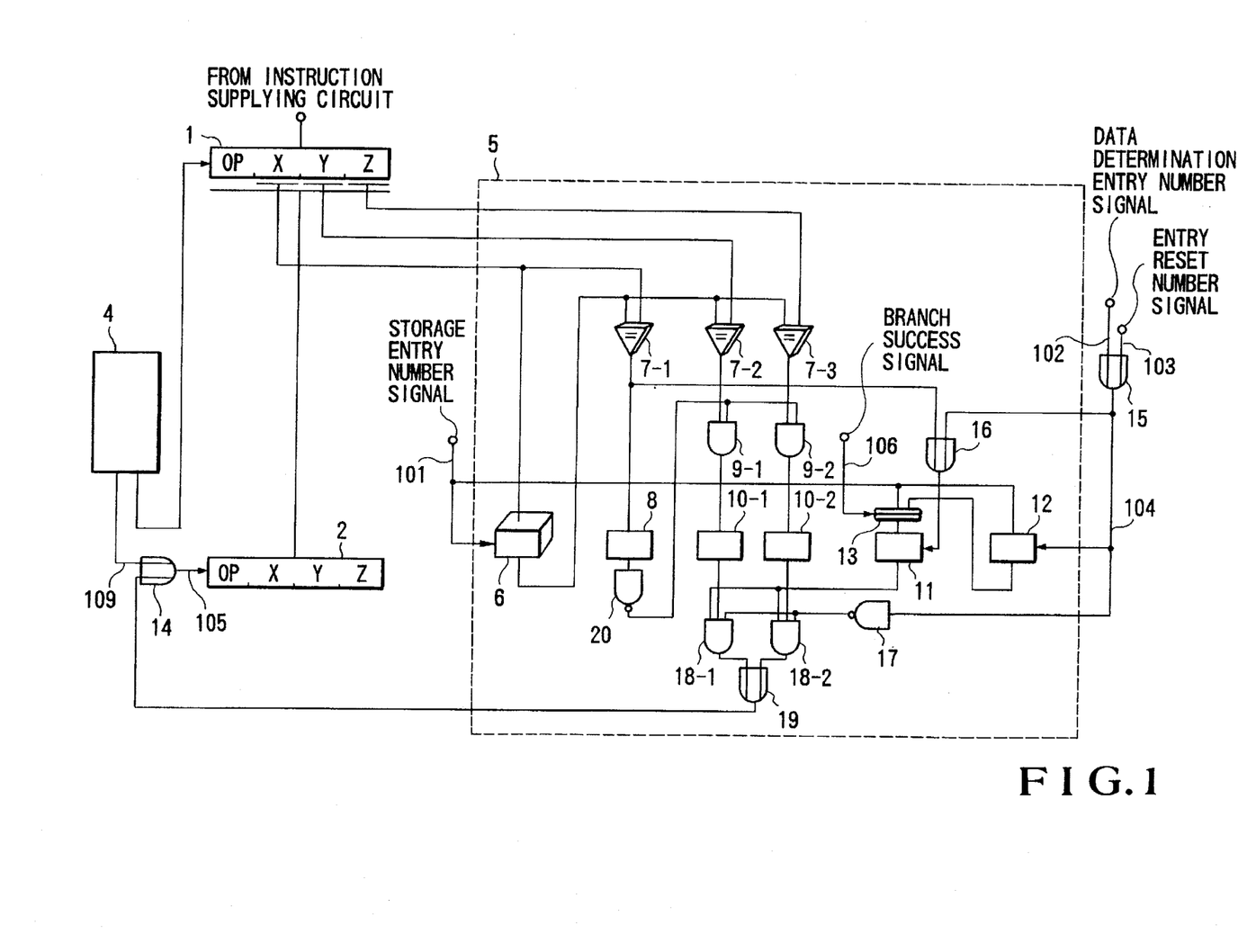
FIG. 1 is a block diagram showing an instruction control circuit according to an embodiment of the present invention.
Figure 3:
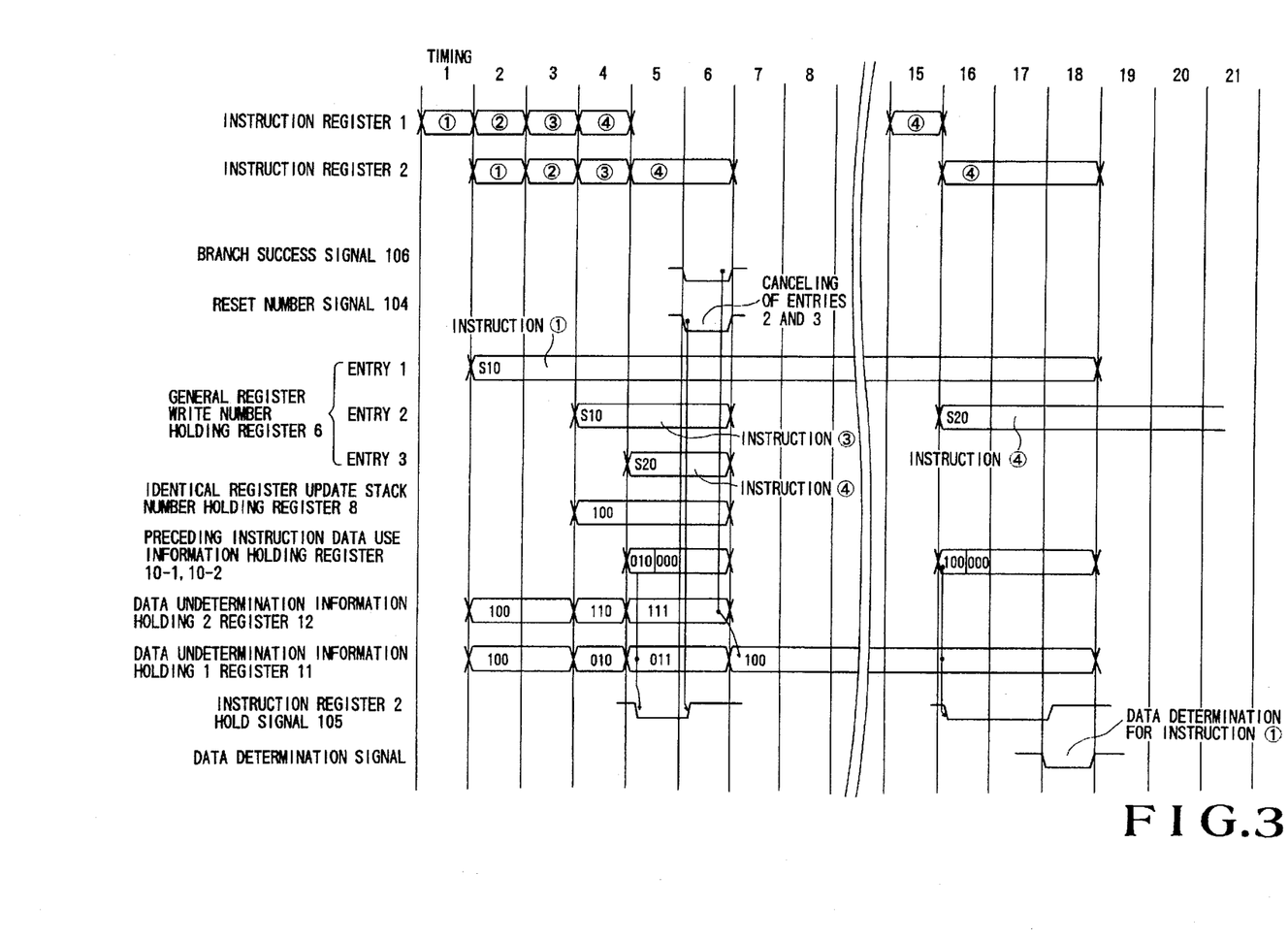
FIG. 3 is a timing chart showing a case wherein the instruction string in FIG. 2 is executed by the instruction control circuit of the embodiment shown in FIG. 1.

FIG. 1 shows an instruction control circuit according to an embodiment of the present invention. FIG. 3 is a timing chart showing a case wherein an instruction shown in FIG. 2 is executed by the instruction control circuit of this embodiment shown in FIG. 1.

Referring to FIG. 1, an instruction register 1 receives instructions and operands from an instruction supplying circuit, and supplies them to an instruction register 2. The instruction registers 1 and 2 are controlled by control signals from an instruction stage control circuit 4 and a data determination control circuit 5 (corresponding to a portion enclosed with a dotted line in FIG. 1).

A general register write number holding register 6 is used when a write instruction with respect to a general register is to be executed. The register 6 has n entries (three entries in this case) and serves to store the number of a general register for which a write operation is performed. The register 6 stores such a number in response to a storage entry number signal 101 which is output when the value of the operand x in the instruction register 1 is transferred to the instruction register 2.

A compare circuit 7-1 detects a coincidence between the operands x respectively stored in the general register write number holding register 6 and the instruction register 1, and stores the value of the operand x in an identical register update stack number holding register (having a 3-bit arrangement in this embodiment) 8. Compare circuits 7-2 and 7-3 detect coincidences between operands y and between operands z respectively stored in the general register write number holding register 6 and the instruction register 1. AND circuits 9-1 and 9-2 then logically AND the values of the operands y and z with a value obtained by inverting the value in the identical register update register number holding register 8 using an inverter 20. The resultant values are respectively stored in preceding instruction data use information holding registers 10-1 and 10-2 (each having a 3-bit arrangement in this embodiment, the 3 bits of the register 10-1 indicating entries 1, 2, and 3 on the y operand side, and the 3 bits of the register 10-2 indicating entries 1, 2, and 3 on the z operand side).

A selector 13 is operated to select a storage entry number signal 101 and a value stored in a data undetermination information holding 2 register 12 and to select the data undetermination information holding 2 register 12 in response to a branch token signal 106. The branch token signal 106 is output when a branch instruction which passes through the instruction registers 1 and 2 makes a branch token.

A data undetermination information holding register 11 stores the information of a bit selected by the selector 13, and is operated to reset an entry bit in which "1" is set when an OR circuit 16 logically ORs the value obtained by the compare circuit 7-1 with a reset number signal 104 as the OR product of an entry reset number signal 102 for canceling an instruction on an instruction stage upon a branch token, and a reset signal (data determination entry number signal 103) corresponding to a data determination entry.

The data undetermination information holding 2 register 12 stores the information of the storage entry number signal 101 and resets an entry bit in which the reset number signal 104 is set.

Subsequently, an OR circuit 19 logically ORs the values of the preceding instruction data use information holding registers 10-1 and 10-2 with a value obtained by masking the value in the data undetermination information holding register 21 with the reset number signal 104 (which is performed by an inverter 17 and AND circuits 18-1 and 18-2). If the resultant value is "1", an instruction register 2 hold 1 signal 108 is logically ORed with an instruction register 2 hold 2 signal 108 by an OR circuit 14. As a result, an instruction register 2 hold signal 105 is enabled and held in the instruction register 2.

When an instruction passes through the instruction register 2, an instruction execution command is executed.

In this embodiment, it is assumed that when a branch failure occurs, instructions subsequent to a branch instruction are on the branch failure side, and when a branch token is made, instructions supplied from the instruction supply circuit again are on the branch success side.

The present invention can be effectively applied to an apparatus including a branch prediction means. Such an apparatus is different from the apparatus of this embodiment only in that instructions subsequent to a branch instruction are assumed to be on the branch prediction success side.

FIG. 2 shows an instruction string designed such that a branch token in a branch instruction is made, and current data determination information is replaced with data determination information immediately preceding the branch instruction. The content of each instruction is the same as that described above.

Assume that a 3-operand instruction is used in this embodiment, and the three operands are respectively called operands x, y, and z, and that data are basically read out from general registers designated by the operands y and z to be calculated, and the calculation result is stored in a general register designated by the operand x.

FIG. 3 is a timing chart obtained when the instruction string in FIG. 2 is executed by the apparatus of this embodiment shown in FIG. 4.

At timing 1, the instruction ① is set in the instruction register 1. At timing 2, since the instruction ① is an instruction to store the resultant data in the general register of number 10, "10" is set in the entry 1 of the general register write number holding register 6, and the instruction ① is transferred to the instruction register 2. Upon setting of the instruction ① in the entry 1, "100" is set in the data undetermination information holding 1 register 11 and the data undetermination information holding 2 register 12, and the instruction ② is newly set in the instruction register 1.

At timing 3, similar to timing 2, the instruction ② is transferred from the instruction register 1 to the instruction register 2, and the branch instruction ② is executed. At timing 4, since the instruction ③ is an instruction to store the resultant value in the general register of number 10, "10" is set in the entry 2 of the general register write number holding register 6. At the same time, "100" is stored in the register update stack number holding register 8 because the compare circuit 7-1 detects a coincidence between the value "10" in the entry 1 of the general register write number holding register 6 and the value "10" in the operand x of the instruction register 1. In addition, although "110" is set in the data undetermination information holding 1 register 11 and the data undetermination information holding 2 register 12 upon setting of the instruction ③ in the entry 2, entry 1 is reset by "100" in the compare circuit 7-1, "010" is set in the data undetermination information holding 1 register 11.

At timing 5, since the instruction ④ is an instruction to store the resultant value in a general register of number 20, "20" is set in the entry 3 of the general register write number holding register 6. In addition, upon setting of the instruction ④ in the entry 3, values "011" and "111" are respectively set in the data undetermination information holding 1 register 11 and the data undetermination information holding 2 register 12.

Furthermore, since the instruction ④ is designed such that data is read out from the general register of number 10 by the operand y, when the compare circuit 7-2 detects a coincidence between the value in the general register write number holding register 6 and the value in the instruction register 1, "110" is supplied, together with "000" for the operand z side, to the AND circuits 9-1 and 9-2.

At this time, "100" stored in the identical register update stack number holding register 8 is inverted by the inverter 20 to obtain "011", and the obtained value is logically ANDed with "110" in the compare circuit 7-2 by the AND circuit 9-1 to obtain "010". The resultant value is then stored in the preceding instruction data use information holding register 101, whereas the value "000" in the AND circuit 9-2 is stored in the preceding instruction data use information holding register 10-2.

Since the AND products of the value ("011") in the data undetermination information holding 1 register 11 and the values ("010" and "000") of the preceding instruction data use information holding registers 10-1 and 10-2 are not "0", "1" is set in the OR circuit 19. As a result, the instruction register 2 hold signal 105 is output through the instruction register 2 hold 1 signal 108. At timing 6, the data in the instruction register 2, i.e., the instruction ④ is held.

At timing 6, since it is determined that the branch instruction ② has succeeded, the reset number signal 104 is output to cancel the instructions ③ and ④ on the branch failure side (i.e., the reset number signal 104 is output to the entries 1 and 2 at which the instructions ③ and ④ are registered). As a result, the instruction ④ is removed from the instruction register 2.

With this operation, "110a" is set in the data undetermination information holding 1 register 11. Upon a branch token, however, the value "100" in the data undetermination information holding 2 register 12 (since the reset number signal 104 is output to the entries 2 and 3, "111" is replaced with "100") is stored in the data undetermination information holding 1 register 11.

At timing 15, the instruction ④ is supplied from the instruction supplying circuit. At timing 16, since the instruction ④ is an instruction to store the resultant value in the register of number 20, "20" is set in the entry 2. At the same time, since the operand y uses the result of the preceding instruction, "100" is set in the preceding instruction data use information holding register 10-1 when a coincidence between the value of the operand y and the value in the entry 1 of the general register write number holding register 6 occurs. In this case, since the AND product between the value ("100") of the data undetermination information holding 1 register 11 and the values ("100" and "000") of the preceding instruction data use information holding registers 10-1 and 10-2, which is obtained by the AND circuit 18-1, is not "110a", the instruction register 2 hold signal 105 is set at logic "1" through the OR circuits 19 and 14. As a result, the instruction ④ is held in the instruction register 2.

At timing 18, a data determination signal for the instruction ① is output, and "110a" is set in the data undetermination information holding 1 register 11. As a result, the instruction register 3 hold signal is canceled. With this operation, holding of the instruction ④ is ended.

When a branch failure occurs, since the instruction ③ immediately succeeding the branch instruction is executed, the current value in the data undetermination information holding 1 register 11 represents the data undetermination state of the instruction. It is, therefore, apparent that the branch instruction is immediately executed.

As has been described above, according to the present invention, the information processing apparatus uses control information corresponding to instructions which can be simultaneously executed, in order to realize parallel execution of instructions. In this apparatus, while the result of a preceding instruction is not stored in a general register, a subsequent instruction to update the same general register can be executed. The apparatus includes a register for holding data determination information immediately preceding a branch instruction to allow an instruction subsequent to the branch instruction to use the result of an instruction preceding the branch instruction which is not determined yet when a branch token is made by the branch instruction, and a mechanism for replacing current data determination information with the above-mentioned data determination information when the branch token is made. With this arrangement, when a branch token is made by a branch instruction, current data determination information is replaced with the above-mentioned data determination information so that execution of an instruction subsequent to the branch instruction can be suspended until the result of an instruction preceding the branch instruction is determined. Therefore, the branch instruction need not be suspended until data determination of all the instructions preceding the branch instruction is completed, and even an instruction string including a branch instruction can be executed at high speed.

What is claimed is:

1. A pipeline repair control apparatus for a pipelined computer system comprising:

data control means for processing instructions in a pipeline and generating data determination information corresponding to said instructions, said data determination information indicating whether or not data required for execution of said instructions are available;

an information holding register for holding data determination information for an instruction preceding a branch instruction; and replacing means for replacing data determination information for an instruction subsequent to the branch instruction, with data determination information held in said information holding register upon branch prediction failure.

2. An apparatus according to claim 1, wherein said information holding register and said replacing means are included in said data control means.

3. An apparatus to claim 1, further comprising an instruction register for sequentially storing instructions supplied to the pipeline, and instruction stage control means for supplying a hold signal to said instruction register in accordance with a signal from said data control means.

4. An apparatus according to claim 1, further comprising means for canceling an instruction stored in said instruction register upon branch prediction failure.

5. An apparatus according to claim 4, wherein said canceling means includes means for resetting said instruction register in a hold state when the branch prediction failure is detected.

6. An apparatus according to claim 4, wherein said canceling means includes means for resetting data determination information held in said information holding register.

7. An apparatus according to claim 1, further comprising a second information holding register for holding data determination information corresponding to said instructions in the pipeline.

8. An apparatus according to claim 1, further comprising a general register write number holding register for storing a general register number designated by an instruction to write in a general register, wherein said general register number stored in said general register write number holding register is erased by said replacing means upon branch prediction failure.

9. An apparatus according to claim 1, wherein said data control means provides the data determination information without stopping a subsequent instruction from being updated in a same register as a preceding instruction which has not finished processing.

10. An apparatus according to claim 1, wherein the replacing means restores the pipelined instructions upon occurrence of the branch prediction failure even when plural instructions to be updated in the same register are executed simultaneously.

11. A control device for restoring pipelined instructions, comprising:

data control means;

information holding register means; and replacing means;

said data control means providing control information relating to the pipelined instructions which can be executed simultaneously so as to control without stopping a subsequent instruction from being updated in a same register as a preceding instruction which has not finished processing, said information holding register means indicating whether or not data is usable, and said replacing means replacing data determination information in the information holding register means on a branch prediction failure, thereby restoring the pipelined instructions during the branch prediction failure even if plural instructions to be updated in the same register are executed simultaneously.

* * * * *